United States Patent [19]

Freeman et al.

[11] Patent Number: 5,390,232
[45] Date of Patent: Feb. 14, 1995

[54] SYSTEM FOR CONTROL OF SUBSCRIBER PROGRAGMMABILITY

[75] Inventors: Brian D. Freeman, Howell; Daryl M. Goins, Irvington; Marc P. Kaplan, Aberdeen; Jonathan F. Potter, Keyport, all of N.J.

[73] Assignee: AT&T Corp., Murray Hill, N.J.

[21] Appl. No.: 997,413

[22] Filed: Dec. 28, 1992

[51] Int. Cl.6 .................... H04M 1/24; H04M 3/42; H04M 3/08; H04M 3/22
[52] U.S. Cl. ........................ 379/15; 379/10; 379/201
[58] Field of Search ............. 379/8, 9, 10, 11, 12, 379/13, 14, 15, 201, 134, 126

[56] References Cited

U.S. PATENT DOCUMENTS

| 4,366,350 | 12/1982 | Lee et al. | 379/10 |
| 4,611,094 | 9/1986 | Asmuth et al. | 179/7.1 |
| 4,945,559 | 7/1990 | Krave et al. | 379/10 |
| 5,101,425 | 3/1992 | Darland et al. | 379/136 X |
| 5,241,580 | 8/1993 | Babson, III | 379/15 |

OTHER PUBLICATIONS

Telephone Quality Measurement System (TQMS) SO-TAS's Telephone Quality Measurement System.

Primary Examiner—Stephen Chin
Assistant Examiner—Paul Loomis
Attorney, Agent, or Firm—Jean-Robert Mirville

[57] ABSTRACT

A subscriber-defined call processing program designed for execution in a communications network is subjected to testing procedures which simulate a call processing environment involving the execution of the program. The testing procedures assess the program's fitness for execution in a communications network and compute threshold values of network resource consumption by calls invoking execution of the program so that those calls can be terminated when those threshold values are exceeded in the course of processing those calls in the communications network.

18 Claims, 9 Drawing Sheets

FIG. 3

| SUBSCRIBER ID | SCRIPT ID | VERSION NUMBER | TESTING DATA ADDRESS – 1 | .... | TESTING DATA ADDRESS – N |
|---|---|---|---|---|---|
| 301 | 302 | 303 | 304 | | |

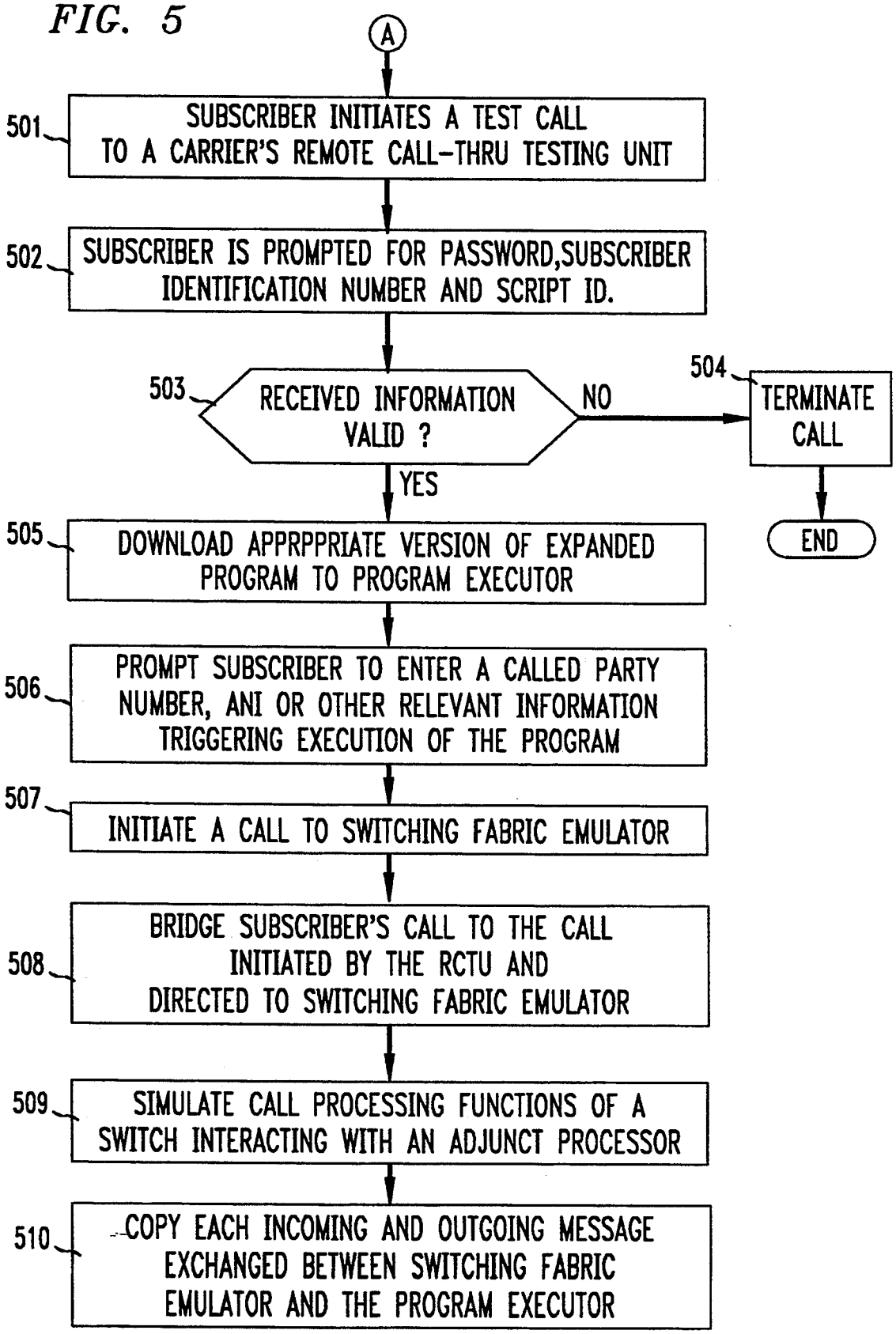

FIG. 6

| COMMANDS STRING | NODE TYPE |
|---|---|
| 601 — SELECT ANI<br>　　IF ANI | ANI TRIGGER — 611 |
| 602 — IF ANSWER<br>　　MONITOR POST-ANSWER | POST-ANSWER CALL REDIRECTION — 612 |
| 603 — INCREMENT VARIABLE<br>　　IF<br>　　　VARIABLE > CONSTANT<br>　　ELSE<br>　　　SELECT TABLE X WITH VARIABLE | CALL ALLOCATOR — 613 |
| 604 — TIME = GETTIME ()<br>　　IF<br>　　　TIME = XXX<br>　　ELSE | TIME DECISION — 614 |
| 605 — PLAY ANNOUNCEMENT ()<br>　　BREAK | COURTESY ANNOUNCEMENT — 615 |
| 606 — PLAY ANNOUNCEMENT<br>COLLECT DIGITS<br>SELECT | CALL PROMPTER — 616 |
| 607 — ROUTE | ROUTE — 617 |
| ⋮ | ⋮ |

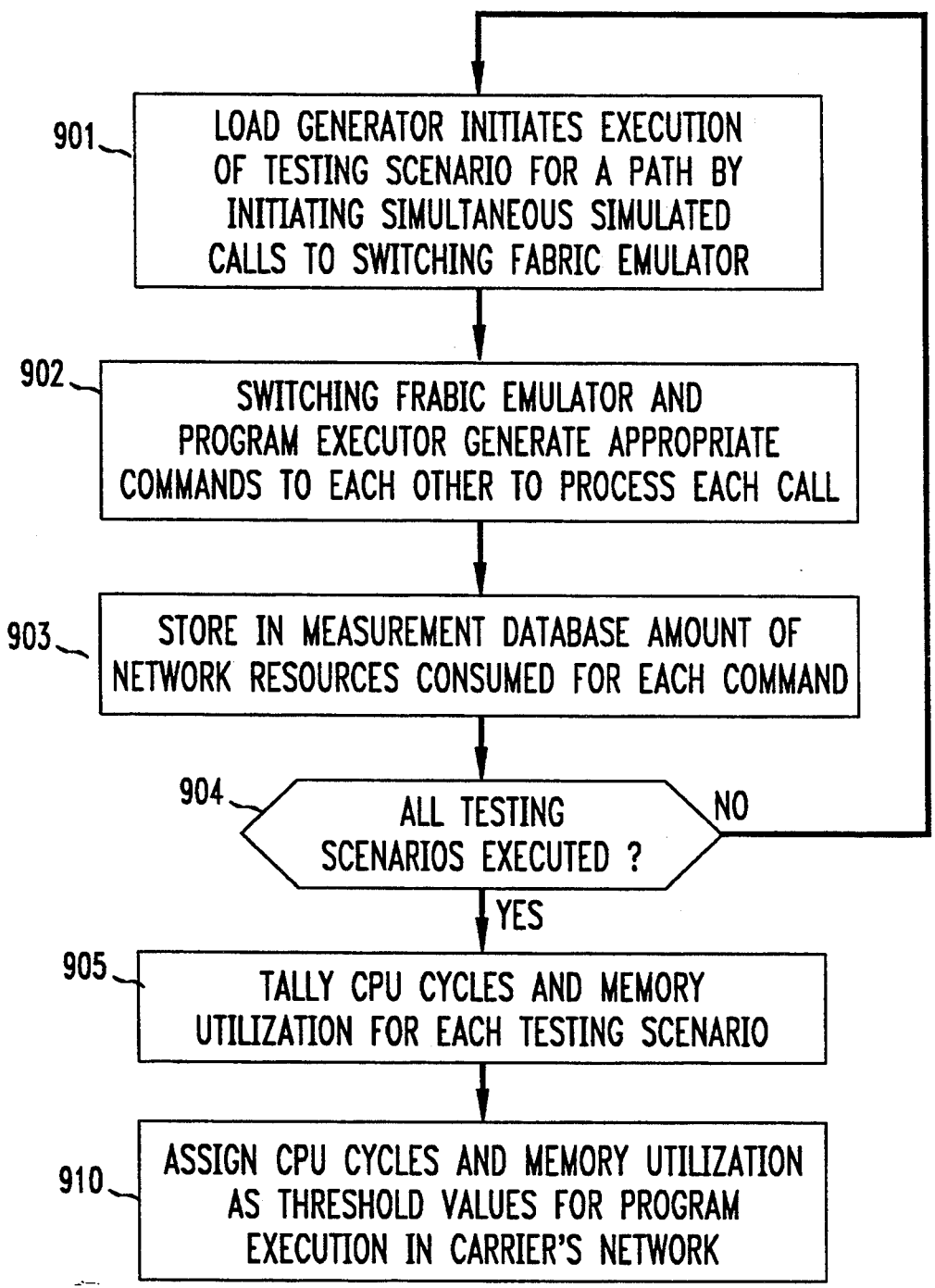

SYSTEM FOR CONTROL OF SUBSCRIBER PROGRAGMMABILITY

TECHNICAL FIELD

This invention relates to communications networks. More specifically, this invention relates to subscriber programmable communications networks.

BACKGROUND

At this time, many business subscribers are unable to fully use public telecommunications networks to obtain competitive advantages because call processing programs which might be tailored for their particular needs are not allowed in today's public telecommunications networks.

Communications carriers have been reluctant to allow subscriber-defined call processing programs to be executed in their networks because there may be negative impacts on the performance of their networks caused by the operations of those programs. For example, a subscriber-defined call processing program which uses too much of a network's resources may prevent other subscribers from completing their calls. Accordingly, for subscriber-defined programs to be acceptable, there must be appropriate safeguards to prevent problems in the rest of the network.

SUMMARY

This invention is an apparatus and a method of testing subscriber-defined call processing programs to provide safeguards against reduced network performance. In specific examples of the invention, the structure of the program and its performance at different simulated traffic levels are tested to determine the program's impact on network performance when those programs are executed in a telecommunications network.

In a more specific example of the invention, a subscriber-defined call processing program is subjected to a static testing procedure which examines the program's syntax, structural soundness, and logical consistency.

In another example of the invention, a subscriber-defined call processing program is subjected to a dynamic testing procedure involving the creation of a call processing environment in which the actual execution of a subscriber-defined call processing program is simulated and the usage of network resources at different simulated traffic levels is measured.

BRIEF DESCRIPTION OF THE DRAWINGS

FIG. 3 shows an illustrative subscriber testing record providing points of reference for data needed for program execution.

FIG. 5 is a flow diagram representing the functions performed by the elements of FIG. 4.

FIG. 6 is a table which maps illustrative sequences of commands to illustrative node types.

FIGS. 8 and 9 are flow diagrams representing additional functions performed by the elements of FIG. 4.

DETAILED DESCRIPTION

Figure 1:
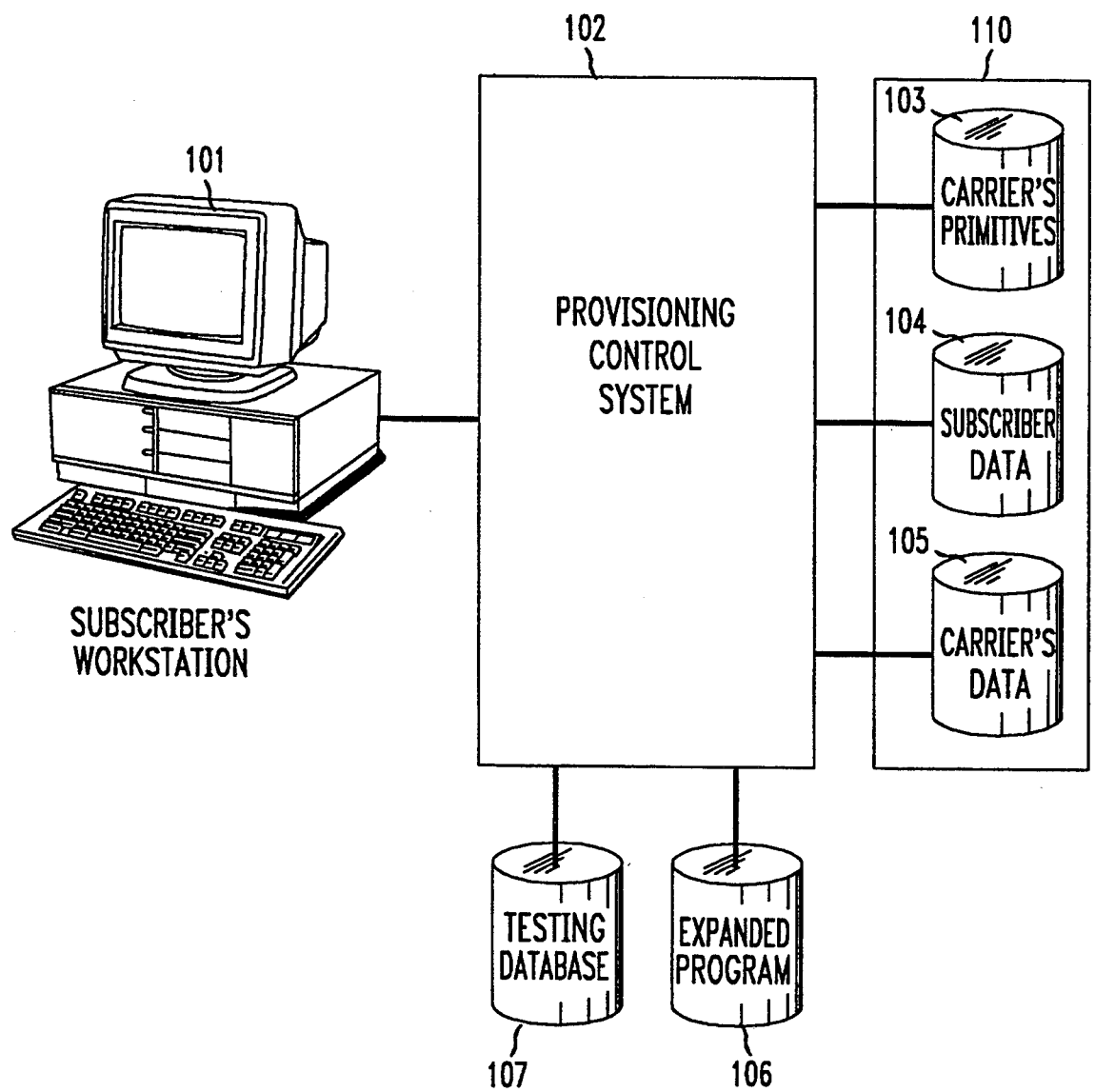
FIG. 1 illustrates a provisioning control system which receives subscriber-defined call processing programs and performs static testing procedures on those programs in accordance with the invention.

FIG. 1 illustrates a provisioning system which receives subscriber-defined call processing programs and performs static testing procedures on those programs in accordance with the invention. A subscriber-defined call processing program, which can be written in an application-oriented language recognizable by a network compiler, may include a set of call processing instructions that can be grouped into node types described in further detail below. A sequence of node types can be designed to provide a specific telecommunications service tailored to a subscriber's business needs. For example, an inbound service subscriber may want to design a program which uses a calling-party-number-trigger table to differentiate incoming calls and provide different grades of service for different classes of callers based on specific criteria.

The provisioning system of FIG. 1 allows the subscriber-defined call processing program to be examined for correct syntax, structural soundness, and logical consistency. The provisioning system of FIG. 1 includes a provisioning control system 102 which is a processor with memory facilities containing, among other things, a network compiler and a testing software package designed to check the syntax of the program received from customer premisis equipment, such as a subscriber's workstation 101 which can be a personal computer or a terminal with enhanced graphics facilities. Storage facilities in a communication carder's execution environment 110 are connected to the provisioning control system 102. Those storage facilities can be logically or physically partitioned among the following components: a) a set of carrier's primitives 103 containing control and routing logic designed to formulate call handling instructions to a switch or an adjunct processor, based on a set of call routing parameters; b) a subscriber database 104 which is a repository of a subscriber's proprietary information, such as customer account data; and c) a carrier database 105 containing carrier-specific information, such as network routing tables, network management information, and application-specific data, such as announcement files or billing information.

Additional storage facilities available in the provisioning system of FIG. 1 include a testing database 107 which contains data needed for the execution of the call processing program and an expanded program library 106 which stores the subscriber's call processing program after it has been compiled and linked.

Figure 2:
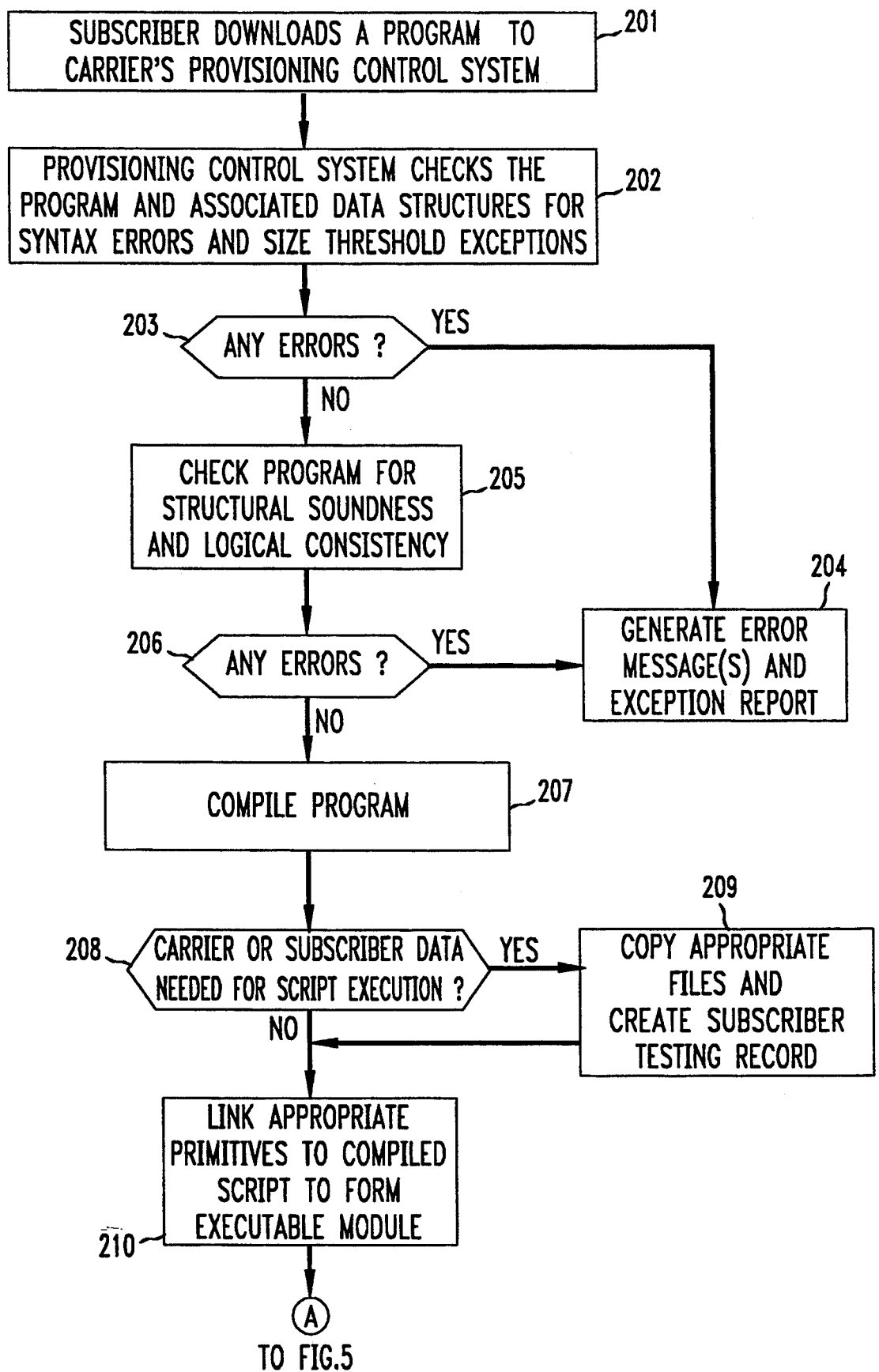
FIG. 2 shows a flow diagram of functions performed by the provisioning system of FIG. 1.

FIG. 2 is a flow diagram representing the functions performed by the provisioning system of FIG. 1. In the flow diagram of FIG. 2, a subscriber creates a call processing source program using a text processing package or a graphical user interface on subscriber's workstation 101, as indicated in step 201. The source program and associated data structures are downloaded to the provisioning control system 102 where the source program is examined for syntax errors in step 202. In addition, data structures associated with the call processing program are also compared to predetermined size thresholds in step 202. A determination is then made in step 203 as to whether any errors were found in the program. If errors were found, provisioning control system 102 is arranged to generate, in step 204, an error message for each syntax mistake in the program, and an exception report when data structures in the program refer to non-existing fields or exceed size threshold recommendations. For example, misspelled programming verbs and undefined fields in a programming instruction will cause an error message to be generated. Similarly, if a program creates an array or a table whose size exceeds the carrier-recommended size for arrays or tables, an exception report will be generated in step 204. The syntax checking and data structure size comparison functionality can be provided by a software package loaded in the memory of subscriber's workstation 101 if the carrier makes that package available to subscribers.

If no errors were found, provisioning control system 102 in step 205 uses a carrier-defined rule-based software to check the program's structural soundness and logical consistency. In that step, the logic flow of the program is scrutinized for flaws, such as potential infinite loops. In addition, the rule-based software is also designed to point out any superfluous code that may lead to increased network resource consumption during execution of the program. Furthermore, the call processing program is analyzed to ensure, for example that routing trees are properly terminated, final handling of calls is provided, and default logic is available for time-out conditions or unavailability of certain data elements, such as the calling party number, sometimes called Automatic Number Identification (ANI). In step 206, a determination is made as to whether any errors were discovered during the checking process of step 205. If any errors were discovered, an error message report is generated in step 204. If no errors were found, however, provisioning control system 102, in step 207, compiles the subscriber's program. It is to be understood that the subscriber's program can be interpreted as opposed to being compiled. Subsequently, provisioning control system 102, in step 208, analyzes the compiled program to determine whether any subscriber or carrier data is needed for its execution. If so, provisioning control system 102, in step 209, copies appropriate files from the subscriber database 104 and the carrier database 105 into the testing database 107 and creates or updates a subscriber testing record (described below). For example, a zip code table is copied into testing database 107 if the program is designed to allow routing of calls to a specific location based on a caller's ANI and the associated zip code.

An illustrative representation of a subscriber testing record is provided in FIG. 3. The testing record comprises a subscriber id field 301 whose content uniquely identifies a subscriber. Script id 302 is a field used to identify a specific call processing program when a subscriber has multiple programs being tested. Version number field 303 is used to distinguish different versions of a program that may be tested at different times. In field 304, testing data address-1 to testing data address-n represent pointers indicating where different types of data needed for the execution of the program are stored in testing database 107.

Provisioning control system 102, in step 210 in FIG. 2, generates appropriate library function calls to link those carrier primitives to the compiled program to form a complete executable module that is downloaded into the library 106 containing expanded programs. Types of primitives which may be added to the subscriber-defined call processing program include a) billing primitives used to bill the subscriber for calls invoking the program; b) network management logic to alert the network of any abnormal call processing conditions; c) translation primitives for deriving conventional destination numbers for special prefix dialing numbers, for example, 700, 800, and 900 numbers; and d) control logic to insure that carriers do not violate Federal Communications Commission (FCC) and state Public Utilities Commission (PUC) interLATA, intraLATA, and international traffic routing rules and regulations.

Figure 4:
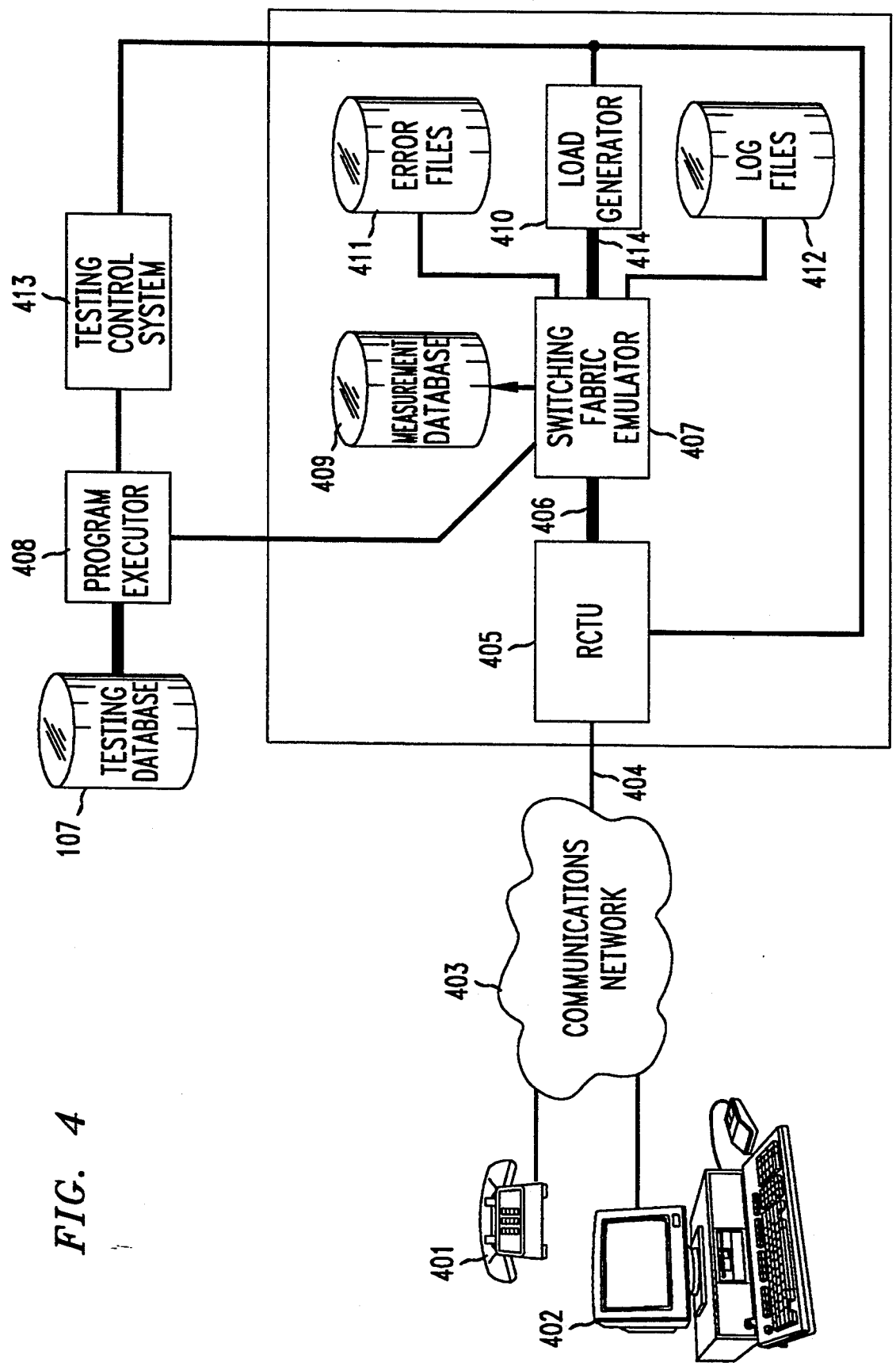
FIG. 4 shows an example of a testing system which performs dynamic testing procedures in accordance with this invention.

In addition to the static testing procedures described above, dynamic testing procedures may be performed. FIG. 4 shows an illustrative testing system which carries out such dynamic testing procedures in accordance with the invention. A dynamic testing procedure comprises three separate processes in this example of the invention. In a first process, called a "functional testing process" in this application, automated testing tools simulate an execution environment in which the subscriber can initiate individual calls designed to trigger the execution of the program and to permit the subscriber to verify the algorithm and to check each specific feature provided by the program. In a second process, called a "call processing path analysis process" in this application, an amount of network resources used to process particular sequences of commands in the program leading to final disposition of a call is estimated. Finally, in a third process, called a "performance testing process" in this application, a carrier-designed traffic simulation program creates a simultaneous multiple call initiation environment for various network load conditions to test the node types in the subscriber's program and to derive run time execution parameter threshold values for the program.

In FIG. 4, a subscriber wishing to test the functional capabilities of a call processing program uses customer premisis equipment, such as a telephone set 401 or a computer 402 (having an appropriate dialing program), to dial a telephone number associated with a Remote Call-through Test Unit (RCTU) 405. The call is switched by a communications network 403 to the RCTU 405. Communications network 403 may include the switching, signaling, and transmission facilities of a Local Exchange Carrier (LEC), an Interexchange Carrier (IXC) or both, arranged to route calls to appropriate destinations.

In FIG. 4, RCTU 405 is connected to communications network 403 via a trunk group 404. RCTU 405 is a processor-controlled, software-driven switching system equipped with an automatic call director facility, designed to answer incoming calls and to allow the merging or bridging of calls from one incoming channel of trunk group 404 to an outgoing channel of a trunk group 406. The operation of RCTU 405 is controlled by system software comprised of commands to i) answer incoming calls; ii) direct callers to enter specific information to process their calls; iii) initiate calls; iv) transfer calls; and v) bridge calls. RCTU 405 is also equipped with disk space storing the subscriber testing record (illustrated in FIG. 3) for the subscriber's call processing program. RCFU 405, for example, may be an AT&T Conversant ® Voice Information System.

FIG. 4 shows a switching fabric emulator 407 connected with RCTU 405 via trunk group 406. The emulator 407 is a processor with memory facilities storing network emulation software designed to simulate the switching and signaling functionality provided by one or more telephone switching systems such as a central office switch or a toll switch or both. More specifically, switching fabric emulator 407 upon receiving call initiation signals (from RCTU 405, for example) generates switching and signaling messages to trigger the execution of certain commands in an adjunct processor of the network in order to process a call. In this example, the adjunct processor is a program executor 408 which stores in its memory the contents of the expanded program located in the library 106 of FIG. 1.

The testing database 107 of FIG. 1 is connected to the program executor 408. The database 107 stores data needed by the program executor 408 to execute the program being tested. Messages generated by the switching fabric emulator 407 are stored in log files 412. Results of the testing procedure performed in switching fabric emulator 407 and program executor 408 are stored in a measurement database 409. More particularly, measurements, such as CPU cycles per call type, acknowledgement message response time per call type, memory utilization per call type, and other measurements are stored in a measurement database 409. The measurement data and the log files generated by switching fabric emulator 407 in the course of the functional testing process may be made available to the subscriber for debugging purposes.

A load generator 410 is connected to switching fabric emulator 407 by means of a trunk group 414. The load generator 410 is a processor capable of executing software programs designed to make several simultaneous simulated calls to the switching fabric emulator 407. In addition, load generator 410 is arranged to generate testing data parameters for various testing scenarios to trigger the execution of the call processing program and various options within the program for different traffic levels.

Load generator 410 receives instructions to generate specific types of testing data from a testing control system 413. Testing control system 413 is a processor arranged to a) download upon request, the appropriate program version stored in expanded program 106 (of FIG. 1) to program executor 408, and b) to devise testing scenarios (described below) to test specific pans of a subscriber's program.

A dynamic testing procedure which allows a subscriber to test the features and functionality of a subscriber-defined call processing program (i.e., the "functional testing process" referred to above) is illustrated in FIG. 5. That testing process is initiated in step 501 when a subscriber places a test call to RCTU 405. The call is routed by the communications network 403 via a channel of trunk group 404 to RCTU 405 which prompts the subscriber for a security code, a subscriber identification number, a program identification number, and the associated version number of the program, if applicable, in step 502. Upon receiving that information, RCTU 405 stores it in a buffer and determines its validity in step 503 by comparing appropriate pieces of the received information to some of the fields in the subscriber testing record illustrated in FIG. 3. If the received information is invalid, the call is terminated in step 504. If the received information is valid, however, RCTU 405 sends a signal to testing control system 413 in step 505 to download the appropriate program version in RAM buffers in the program executor 408. In step 506, RCTU 405 prompts the subscriber to enter a called party number and other relevant information, such as an ANI, to trigger the execution of the call processing program. Upon receiving that information, RCTU 405, in step 507, initiates a call to switching fabric emulator 407. In step 508, RCTU 405 bridges the subscriber's call and the call directed to switching fabric emulator 407 to create a communication path from the subscriber to switching fabric emulator 407. In step 509, switching fabric emulator 407 simulates the functions of a telephone switching system interacting with an adjunct processor represented in this example by the program executor 408. That interaction includes a) exchange of call processing signaling messages between switching fabric emulator 407 and program executor 408; b) flow of commands and call handling instructions between the switching fabric emulator 407 and the program executor 408; and c) retrieval of data from database 107 needed to process a test call. Messages generated by switching fabric emulator 407 include set-up messages involving at least a destination number for a simulated call, disconnect messages to terminate calls, and other messages. Switching fabric emulator 407 may also interact with the subscriber by presenting announcements to the subscriber to enter additional information to process the call. In step 510, switching fabric emulator 407 makes a copy of each call processing message, such as Transaction Capabilities Application Part (TCAP) or ISDN User Part (ISUP) messages exchanged between the switching fabric emulator 407 and the program executor 408. The emulator 407 stores those messages in log files 412. Errors and anomalies identified by switching fabric emulator 407 or received from program executor 408 are stored in error file 411. The call processing messages and the error files may be provided to the subscriber for debugging purposes. The execution of instructions in program executor 408 combined with the simulated functions performed by switching fabric emulator 407 allow the subscriber to verify some of the features provided by the program. For example, by analyzing a message, such as a SETUP message, generated by switching fabric emulator 407 in response to instructions from program executor 408, a subscriber can verify the routing algorithm of a program.

Figure 7:
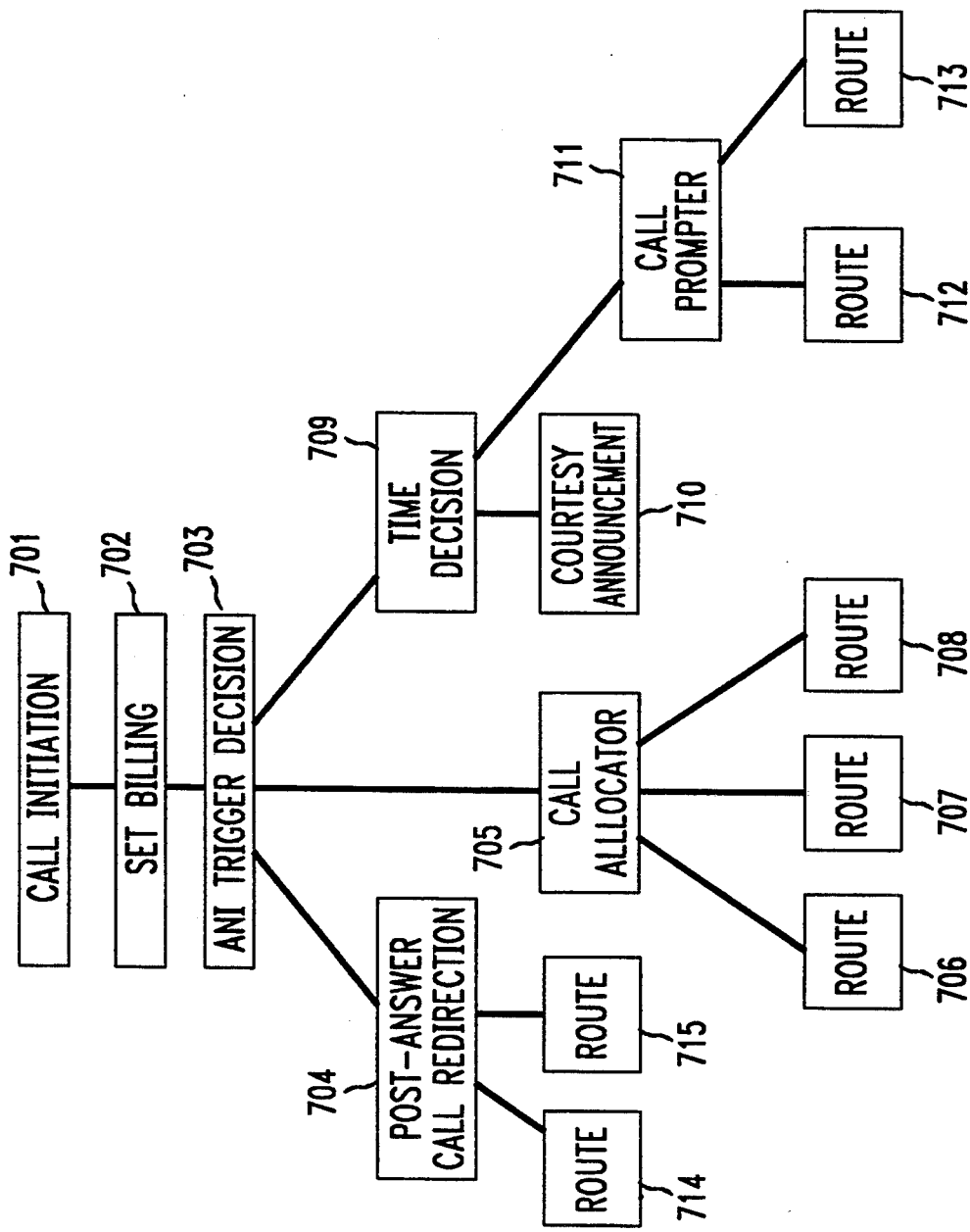
FIG. 7 depicts a decision tree of an illustrative subscriber-defined call processing program.

Once the subscriber is satisfied with the results of the functional testing process, the call processing program is subjected to the previously mentioned process called the "call processing path analysis process". In order to explain the operations of that process, a specific example of a subscriber designed call processing program is shown in FIGS. 6 and 7. That program is represented by a simplified, illustrative, pseudo code set of programming instructions shown in Table 1 below.

TABLE 1

```
while(next_node != NULL ) {
        switch(next_node) {
case 1:
case 2:
  Bill();
  next_node=3;
case 3:
  select * from TableAN11 where ANI=ani();
  if(current_row_field == RECORD_NOT_FOUND)
     next_node=9;
  if(current_row_field(1) == GOLD)
     next_node=4;
  if(current_row_field(1) == LITE)
     next_node=5;
  break;
case 4:
  Route(PreAnswer=Yes);
  if ( Route.status == RingNoAnswer)
     next_node = 6;
  if ( Route.status == Answer )
     Monitor( PostAnswer = Yes) ;
```

TABLE 1-continued

```
        if(Monitor.Digits == "*124") {
            PlayTextAnnouncement( "Your Call is being
            transferred to a Sales Agent", Calling Leg)
            BlindTransfer( next_node = 7 );
        }
        if(Monitor.Digits == "*123") {
            PlayTextAnnouncement( "Your Call is being
            transferred to an Order Taker", Calling Leg)
            BlindTransfer( next_node = 10 );
        }
        next_node=NULL;
        break;
    case 5:
        select * from CurrentPercentCall(1) ;
        nextentry=current_row_field(1);
        increment CurrentPercentCall(1).field(1)
            if CurrentPercentCall(1).field(1) > 99
                CurrentPercentCall(1).field(1) = 0
            else
        select * from CallAllocatorTable(1) where
                REC_NUM == nextentry;
        next_node = current_row_field(1);
        break;
    case 6:
        route();
        next_node=NULL;
        break;
    case 7:
        route();
        next_node=NULL;
        break;
    case 8:
        route();
        next_node=NULL;
        break;
    case 9:
        PlayAnnouncementCollectDigits();
        if(ReturnDigitsLength() == 5) {
            select * from ZipCodeTable where Zip == ReturnDigits() ;
            next_node= current_row_field(1);
            break;
        }
        else {
            next_node= 10;
            break;
        }
    case 10:
        route();
        next_node=NULL;
        break;
    case 11:
        time=TimeDay(timezone,dst);
            if((time.day < FRIDAY) &&( time.day > MONDAY ) )
                next_node=12;
            else
                next_node=13;
        break;
    case 12:
        route();
        next_node=NULL;
        break;
    case 13:
        Announcement();
        next_node=NULL;
        break;
}
```

In this case, a subscriber wants to design and install on a public switched telephone network a program to provide the following call processing capabilities. The subscriber in question wishes to classify incoming calls into two groups, namely, calls for which ANI records exist in the subscriber database 104 of FIG. 1 and calls for which no such ANI record exists. Callers associated with the first group of calls are to be further classified as preferred customers and good customers based on prior business dealings with the subscriber. The programming instructions associated with case 3 in Table 1 represent illustrative instructions that may be used to accomplish the aforementioned customer classification process. That process is also represented by the ANI trigger decision node type 611 in FIG. 6 and 703 in FIG. 7.

In addition, the subscriber wants calls from "preferred customers" to be initially screened by a special group of agents before those calls are transferred to a specific agent, such as an agent who either handled the last call from that customer or is a specialist in the type of services or merchandise of interest to the preferred customer. Illustrative, simplified programming instructions for that screening and transferring process are shown in Table 1 under the case 4 heading. The node type associated with those instructions is represented by post-answer call redirection node 612 in FIG. 6 and 704 in FIG. 7.

Calls from "good customers" are to be allocated on a round-robin basis to different groups of agents, as indicated by the illustrative programming instructions associated with case 5 in Table 1. That call allocation process is also represented by call allocator node 613 in FIG. 6 and 705 in FIG. 7.

A customer who initiates an ANI-unknown call during business hours is prompted to provide additional information, such as a zip code which causes the call to be routed to a specific group of attendants assigned to service calls initiated from telephone sets within the zip code entered by the customer. The "case 11" illustrative instructions in Table 1 may be used to determine whether or not the call is received by the subscriber during business hours. The "case 9" instructions in Table 1 may be used to implement the call prompting process. The time decision process is shown as time decision node 614 and 709 on FIGS. 6 and 7 respectively. Similarly the call prompter capability is shown as call prompter node 616 in FIG. 6 and 711 in FIG. 7. During off-business hours, a courtesy announcement would be presented to ANI-unknown calling customers inviting them, for example, to call back during business hours or to leave a phone number at which they can be called back. The courtesy announcement capability is shown as courtesy announcement node 615 and 710 in FIGS. 6 and 7, respectively and may be implemented using the simplified instructions under the case 13 heading in Table 1. Finally, "cases" 6, 7, and 8 in Table 1 show routing instructions also represented by route node 617 in FIG. 6 and 706, 707,708, 712, and 713 in FIG. 7.

FIG. 6 illustrates a table which maps groups or sequences of commands in the program of Table 1 to specific illustrative node types. A node type is a sequence of programming instructions that are ordinarily considered together and define a specific call processing functionality. A node type can be viewed as a programming verb comprising a string of machine language commands defining a specific call processing function. As shown in FIG. 6, the sets of instructions 601, 602, 603, 604, 605, 606, and 607 correspond to the node types 611, 612, 613, 614, 615, 616, and 617, respectively. In FIG. 6, a call prompter node 616 comprises a sequence of commands "play announcement", "collect digits", and "select". Similarly, a round robin call allocator node type 613 comprises a string of commands a) "increment" with an associated variable; b) "if then else" with the condition predicated on that variable; c) "select" a table with that variable; and d) "route" or "go to next node".

Thus, by associating appropriate node types to sequences of commands in the program of Table 1, the program can be represented by a decision tree, such as the decision tree shown in FIG. 7. The decision tree of FIG. 7 comprises multiple branches referred to as "call processing paths" leading to a final disposition of a call. The call processing program, as represented by the decision tree of FIG. 7, comprises a call initiation node 701, a set-billing node 702, followed by an ANI-trigger decision node 703. The set-billing node is one of the carder primitives added to the subscriber-defined program. The function of that node is to arrange for billing measurement data to be collected for calls invoking execution of the program. Branching out of the ANI-trigger decision node 703 are a) a post answer call redirection node 704 leading to route nodes 714 and 715; b) a call allocator node 705 leading to route nodes 706, 707, and 708; and c) a time decision node 709 leading to either a courtesy announcement node 710 or a call prompter node 711 followed by route nodes 712 and 713. Each logical string of nodes called a "call processing path" leads to a a final call disposition in the decision tree of FIG. 7.

Figure 8:
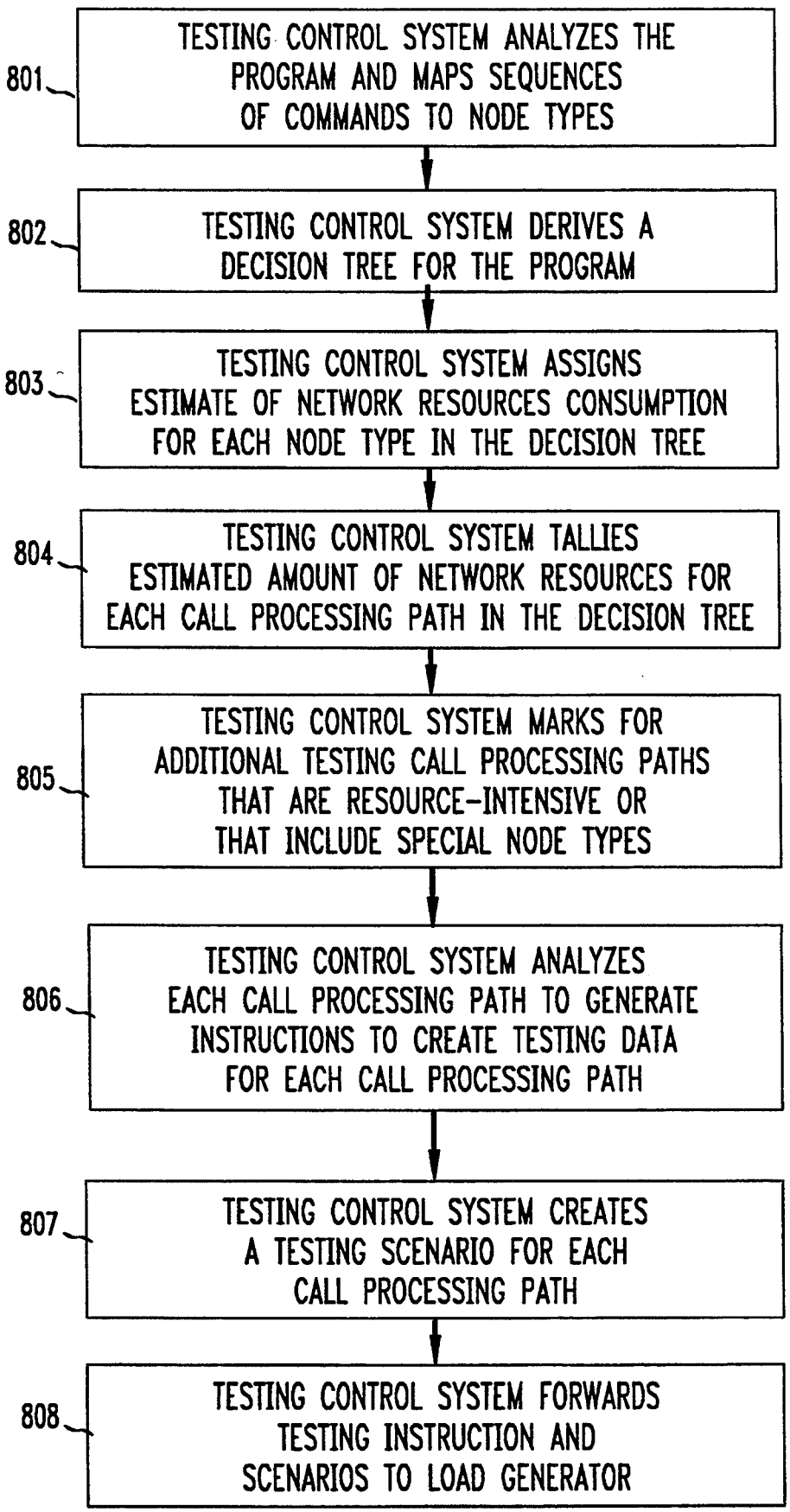

The "call processing path analysis process" of a subscriber defined call processing program, such as the program illustrated in FIGS. 6 and 7, is initiated in step 801 of FIG. 8, when testing control system 413 analyzes the executable module to correlate sequences of commands in the program to specific node types, as illustrated in FIG. 6. Software loaded in the memory of testing control system 413 is arranged to recognize sequences of commands and to associate specific node types to particular sequences of commands, as illustrated in FIG. 6. Subsequently, testing control system 413 derives, in step 802, a decision tree, like the one shown in FIG. 7, from the sequence of node types ascertained as being in the program. Testing control system 413, in step 803, uses the telecommunications carrier's historical data to assign estimates of network resource consumption expected as a resulting of executing each node type in the decision tree. Thereafter, in step 804, testing control system 413 tallies for each call processing path, the estimated amount of network resources needed for completion of a call through that path. Call processing paths that either include special node types or use high mount of network resources are marked for additional testing in step 805. A node is considered a special node type if the estimate of network resources for that node type is likely to fall outside of predetermined levels. For example, the round robin allocator node and the post-answer call redirection node are considered special node types because they involve unusual amounts of network resource usage, such as handling a large number of table entries or manipulating a large number of variables.

Testing control system 413, in step 806, analyzes each call processing path and directs appropriate instructions to the load generator 210. The load generator 210 produces appropriate testing data parameters that will force a specific sequence of node types to be executed. For example, if no ANI record for a specific area code is stored in testing database 107, load generator 210 will produce ANI data for that specific area code to test the call prompter node 711 which is executed (as mentioned above) only for ANI-unknown calls. Similarly, testing control system 413 will send appropriate instructions to the load generator 210 to produce the appropriate testing data for the time range which will cause a courtesy announcement to be played to a caller.

In order to permit the testing environment to reflect a real execution platform, the testing environment must simulate traffic comprising telephone calls which invoke execution of the program and telephone calls which do not invoke execution of the program. Testing control system 413 accordingly produces, in step 807, instructions to be executed by the load generator 210 to produce data causing the switching fabric emulator 207 to receive a mix of simulated calls. Some of the calls in that mix require the execution of the program while other calls in the mix play the role of other subscribers traffic on a network which does not require execution of the program. Calls that do not require execution of the program are hereinafter referred to as "background load". In addition, testing control system 413 generates instructions for load generator 210 to create a testing environment called "testing scenario" for each call processing path. Characteristics of each testing scenario may include a) the number of simultaneous phone calls to be initiated; b) a mix of testing data triggering simultaneous execution of multiple call processing paths; c) the amount of background load; and d) the length of testing period, among others. For example, marked call processing paths will have testing scenarios in which the subscriber-defined program is tested for longer periods of time with higher background load and a greater number of simultaneous phone calls. In step 808, testing control system 413 forwards all instructions and testing scenarios to load generator 210 which executes the received instructions to create (using a stochastic process, for example) testing data for each testing scenario and stores them in its internal storage facilities.

Once testing data has been generated for the program, the process of testing the performance of the program under various load conditions is initiated in step 901 in FIG. 9 when load generator 210 simulates the initiation of multiple simultaneous calls to switching fabric emulator 207 using a testing scenario for a particular call processing path. The number of simultaneous calls initiated for a particular testing scenario may vary during the performance testing process to emulate the normal and peak traffic load experienced by a carder. In step 902, switching fabric emulator 207 and program executor 208 generate and send to each other appropriate commands and call processing messages to process each simulated call. In step 903, switching fabric emulator 207 records for each command and each call processing message the number of CPU cycles and the memory space allocated for processing the command or generating the message. In step 904, the load generator 210 determines whether all testing scenarios have been executed for all call processing paths. If all testing scenarios have not been executed, steps 901 through 903 are repeated until all testing scenarios are executed. Then, in step 905, the switching fabric emulator 206 tallies the CPU cycles used and memory space allocated for each call processing path and computes an average CPU execution time for a call invoking the execution of the program. That information is forwarded to provisioning control system 102 which uses that information to assign, in step 906, threshold values for CPU cycles and memory allocation for execution of the program in the carrier's network.

Two arrangements can be used to determine the threshold values which will trigger call termination when those threshold values are exceeded for calls invoking the program. In the first arrangement, the highest value for CPU cycles and memory space allocation derived from the tally are used as threshold values for the program execution for each call. More specifically, when those threshold values are exceeded for a particular call invoking the execution of the program, the call will be terminated to prevent any negative impact on the processing of other subscribers' calls in the communications network.

In the second arrangement, each subscriber is assigned a portion of CPU execution time in a processor (such as program executor 208) dedicated to program execution in the real execution platform of the communications carrier's network. The portion of CPU execution time assigned to a subscriber can be calculated as the number of calls per second the subscriber is expecting to invoke execution of the program divided by the number of CPU cycles derived for the most resource-intensive call processing path in the program. If a subscriber exceeds his assigned CPU execution time, he will experience longer post dialing delay for his traffic when the network is not overloaded. Even though the threshold value is exceeded, calls invoking the program are allowed to be completed because the network has spare processing resources that are allocated, for example, on a first-come-first-serve basis, to subscribers sharing the processor to avoid termination of calls when the carder has idle network resources available. At network peak traffic load, if the subscriber exceeds his assigned threshold CPU execution time, calls invoking the program will be terminated prior to program execution to prevent other subscribers from being negatively impacted by the execution of the program.

We claim:

1. A method of testing a subscriber-designed call processing program to be executed in a communications network comprising the steps of:
   receiving in a communications network a subscriber-designed call processing program;
   simulating a call processing environment involving execution of said call processing program for different simulated traffic levels in the communications network;
   measuring usage of network resources in said simulated call processing environment, and
   deriving network resource usage threshold values for said call processing program.

2. The method of claim 1 further comprising the steps of:
   assigning said threshold values to said call processing program when said call processing program is loaded for execution in said communications network.

3. A method of executing in a communications network a subscriber-designed call processing program previously tested in accordance with the method of claim 2 comprising the step of:
   terminating calls invoking said call processing program when said threshold values are exceeded by invocation of said call processing program.

4. The method of claim 1, wherein said step of simulating said call processing environment comprises the steps of:
   applying one or a concurrent plurality of call initiation signals to a first processor which emulates a switching fabric;
   generating call processing messages and program instructions in said first processor in response to the application of said call initiation signals;
   forwarding said processing messages and said program instructions to a second processor to trigger execution of said call processing program in said second processor;
   receiving in said first processor response and acknowledgement messages from said second processor; and
   evaluating said response and acknowledgement messages received in the first processor to assess execution behavior of said call processing program.

5. The method of claim 1 wherein said traffic levels comprise a mix of calls invoking execution of said call processing program and other calls not invoking execution of said call processing program.

6. The method of claim 1 wherein said step of measuring usage of said network resources comprises the step of:
   identifying how many CPU cycles and how much memory space is used to process at least one call invoking said call processing program.

7. The method of claim 6 wherein said step of identifying how many CPU cycles and how much memory, space is used to process at least one call invoking said call processing program further comprises the step of determining a billing rate for said call.

8. The method of claim 1 further comprising the steps of:
   compiling said call processing program and linking said call processing program to predefined primitives in said communication network;
   assessing whether said call processing program can be correctly executed in said communication network; and
   generating testing data to trigger execution of each call disposition in said call processing program.

9. The method of claim 8 wherein said assessing step comprises the steps of:
   a) insuring that execution of said call processing program leads to permissible routing destinations;
   b) verifying that said call processing program provides for final disposition of each call invoking execution of said call processing program; and
   c) checking said call processing program for logical soundness and consistency.

10. The method of claim 9 wherein an error report is generated upon a determination that said call processing program does not satisfy any of steps a), b) and c).

11. The method of claim 8 wherein said assessing step further comprises the steps of:
    receiving call initiation signals from a caller; and
    prompting said caller to input information to trigger activation of said simulation of said call processing environment.

12. A method of creating data to test a subscriber-designed program to be executed in a communications network, comprising the steps of:
    mapping sequences of instructions in said subscriber-designed program to specific node types;
    identifying conditions which cause execution of each node type
    generating testing data within ranges of parameter values satisfying said conditions for each node type.

13. A method of testing a subscriber-designed call processing subscriber-designed program to be executed in a communications network, comprising the steps of:
    generating code for said program recognizable by processors in said communications network;

linking said generated code to predefined programs needed for execution of said subscriber-designed program to form an executable module; and simulating call processing functions to evaluate execution behavior of said executable module under different load conditions; and deriving network resource threshold values to be assigned to said subscriber-designed program in said communications network.

14. A method of executing in a communications network a subscriber-designed call processing program previously tested in accordance with the method of claim 13 comprising the step of:

terminating calls invoking said subscriber-designed program in said communications network when said threshold values are exceeded by invocation of said subscriber-designed program.

15. The method of claim 13 wherein said evaluation includes verifying call processing functions provided by said subscriber-designed program.

16. A method of testing a subscriber-designed call processing program to be executed in a communications network comprising the steps of:

receiving in a communications network a subscriber-designed call processing program;

checking said program for syntax errors;

examining each data structure in said program to determine whether a characteristic of said data structure exceeds a predetermined threshold;

identifying superfluous code and logic flaws; and ascertaining whether said program includes default logic for time-out conditions and final handling for each call processing path.

17. A system for testing a subscriber-designed call processing program to be executed in a communications network comprising:

means in a communications network for receiving a subscriber-designed call processing program from customer premises equipment;

means for simulating a call processing environment involving execution of said subscriber-designed program for different simulated traffic levels in the communications network; and means for measuring usage of network resources in said simulated call processing environment to derive run time execution threshold values for said call processing program.

18. A system of executing in a communications network a subscriber-defined call processing program tested in accordance with the system of claim 17 comprising:

means for assigning said threshold values for said subscriber-defined program in said communications network; and means for terminating calls invoking said subscriber-defined program when said threshold values are exceeded.

* * * * *